United States Patent
Bhargava et al.

[11] Patent Number: 6,072,586
[45] Date of Patent: Jun. 6, 2000

[54] COMPUTER PROGRAM PRODUCT FOR STORING PRESELECTED ZOOM AND CROP DATA

[75] Inventors: Vinay Bhargava, Rochester; Anthony J. Leone, Pittsford, both of N.Y.

[73] Assignee: Eastman Kodak Company, Rochester, N.Y.

[21] Appl. No.: 08/707,557

[22] Filed: Sep. 4, 1996

[51] Int. Cl.[7] .................................. G06F 3/12; H04N 1/38
[52] U.S. Cl. ........................ 358/1.15; 358/527; 358/453
[58] Field of Search ...................................... 395/114, 117, 395/102; 358/527, 487, 501, 401, 451, 453, 528, 538; 396/311

[56] References Cited

U.S. PATENT DOCUMENTS

| | | | |
|---|---|---|---|
| 5,258,859 | 11/1993 | Wada et al. | 358/487 |
| 5,270,755 | 12/1993 | Ohno et al. | 396/311 |
| 5,477,353 | 12/1995 | Yamasaki | 358/487 |
| 5,666,215 | 9/1997 | Fredlund et al. | 358/487 |

*Primary Examiner*—Scott Rogers
*Attorney, Agent, or Firm*—Peyton C. Watkins

[57] ABSTRACT

A computer program product for processing digital images for eventual transmission to a remote photofinisher, the computer program product comprises a computer readable storage medium having a program stored thereon for performing the steps of: receiving a computer-readable data file having a digital representation of an image; receiving at least two coordinates that define a portion of the image which is to be included when a hardcopy is printed by the photofinisher; concatenating the coordinates onto the data file for integrally attaching the coordinates thereto for forming a revised, computer-readable data file; and storing the revised data file.

5 Claims, 2 Drawing Sheets

COMPUTER PROGRAM PRODUCT FOR STORING PRESELECTED ZOOM AND CROP DATA

APPENDIX

The disclosure in the appendix of this patent disclosure of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

FIELD OF THE INVENTION

The invention relates generally to the field of transmitting digital images to a remotely located photofinisher and, more particularly, to encoding preselected zoom and crop data with the image for use by the photofinisher in creating a cropped image.

BACKGROUND OF THE INVENTION

Images are typically captured by either a digital or conventional camera and then processed for creating a hardcopy of the image. In the case of conventional cameras, the customer takes the film containing the images to a retailer where the images are converted into hardcopy prints. The film is either processed at the facility or sent to a remote processing laboratory, and, after such processing, both the prints and negatives are then returned to the customer.

In the case of a digital camera, a memory card contains the captured images, and is inserted into a computer for eventually obtaining a hardcopy print. The user may have a computer and printer at home for printing a hardcopy or, if not, the memory card is taken to a retailer, as in the case of conventional camera printing.

Although the above-described method for obtaining hardcopy prints is satisfactory, it is not without drawbacks. When prints are sent to a photofinisher, image enhancement features, such as zoom and crop, are not included with the initial printing. Consequently, if such features are needed, the user takes the finished prints to a retailer having such image enhancement feature equipment, such as the "KODAK" Digital Print Station, for obtaining a second set of prints with the desired features. However, obtaining a second set of prints is costly, time consuming and inconvenient.

Consequently, a need exists for receiving the initial set of prints with the desires image enhancement features.

SUMMARY OF THE INVENTION

The present invention is directed to overcoming one or more of the problems set forth above. Briefly summarized, according to one aspect of the present invention, the invention resides in a computer program product for processing digital images for eventual transmission to a remote photofinisher, the computer program product comprising a computer readable storage medium having a program stored thereon for performing the steps of: (a) receiving a computer-readable data file having a digital representation of an image; (b) receiving image enhancement data which is to be included when a hardcopy is printed by the photofinisher; (c) concatenating the data onto the data file for integrally attaching the data thereto for forming a revised, computer-readable data file; and (d) storing the revised data file.

It is an object of the present invention to overcome the above-described drawbacks.

It is a feature of the present invention to provide concatenating coordinates onto the image data file for later transmission to a remote location.

It is an advantage of the present invention to provide a cost efficient method for concatenating the coordinates.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

As used herein, computer-readable storage medium may comprise, for example; magnetic storage media such as magnetic disk (such as a floppy disk) or magnetic tape; optical storage media such as optical disk, optical tape, or machine readable memory (ROM), or read only memory (RAM); or any other physical device or medium employed to store a program.

Figure 1:
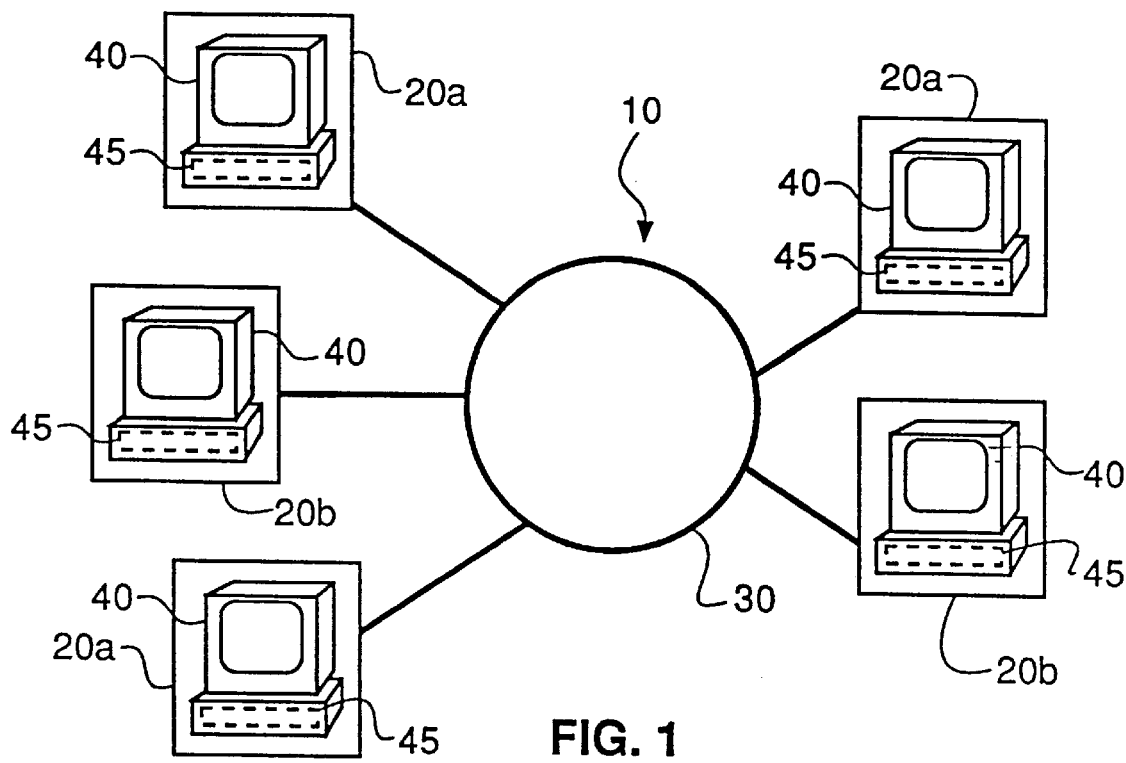
FIG. 1 is a schematic diagram of a fulfillment system for developing images.

Referring to FIG. 1, there is illustrated a schematic diagram of a fulfillment system 10 for transmitting digital images between a plurality of physically spaced-apart sites 20. A portion of the sites 20a are retail locations where retailers receive captured images from customers for printing. The images, if not already in digital form, are converted to a digital representation of the image, and are then transmitted by the retailer over a network 30 to one of a plurality of photofinishers 20b that are connected to the network 30, generally referred to in the art as a fulfillment site 20b, for actual printing.

It is instructive to note that, for acquiring the images in digital format at the retail site 20b, the images are preferably captured by a digital camera by the customer or, in the case of image capture by a conventional camera, the images are preferably scanned into a scanner for converting it into digital form. A computer 40 is preferably installed at each site for receiving the digital representation, performing image processing by any suitable well known image processing software, and then, if necessary, transmitting the digital representations of the images. The computer 40 includes a computer-readable storage medium 45 therein for storing computer programs thereon.

Figure 3:
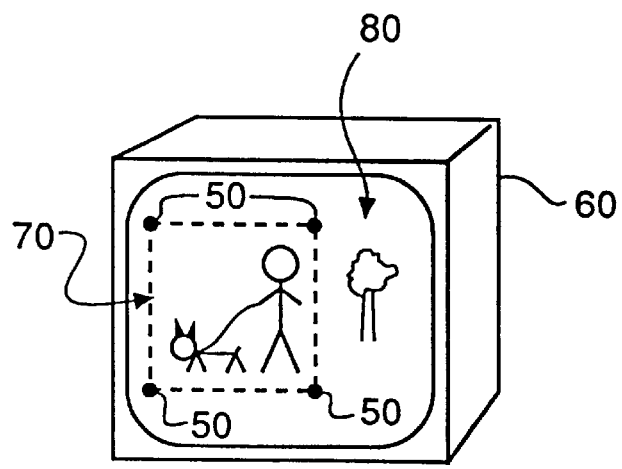
FIG. 3 is a front view of a digital representation of a typical image displayed on a monitor.
Figure 2:
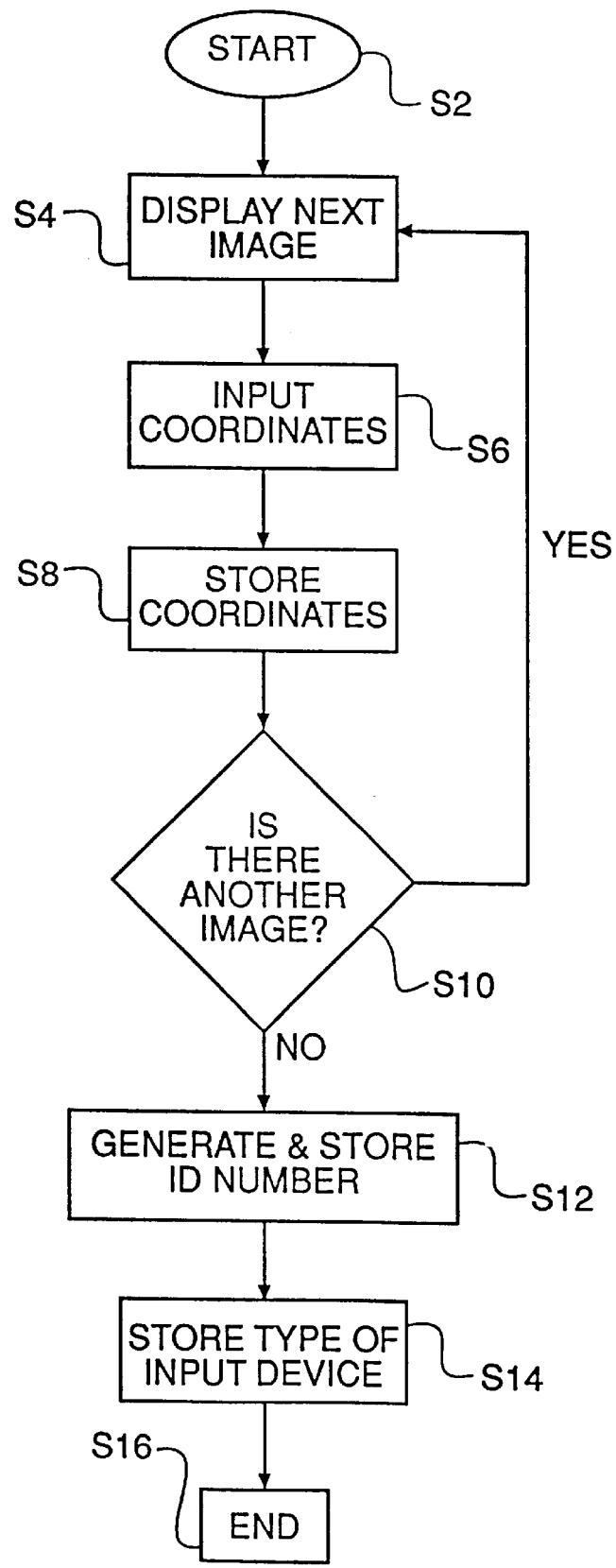
FIG. 2 is a software program of the present invention.

Referring to FIG. 2, there is illustrated a software program of the present invention for concatenating additional information to the digital representation at the retail site 20a before it is transmitted to a retail location 20b. The software program is stored on a computer-readable storage medium (not shown) on the computer 40 at each retail location 20b, and may be manipulated either by a customer or an employee of the retail site 20b. The software is initiated S2 for permitting the digital representation of the images to be received by the computer 40. In the case of scanning, the images are scanned into the computer 40 and, in the case of a digital camera, a memory disk of the camera is inserted into the computer 40. The images are sequentially displayed S4 on a monitor for permitting the user to input zoom and crop data that can be stored as a part of each image file. Once the image is displayed, the user manipulates a mouse for inputting S6 four points that indicate the portion of the image to be actually printed. Referring briefly to FIG. 3, the points 50 on the monitor 60 define the corners of a rectangle which portion 70 inside the rectangle is the portion to be printed. Obviously, the portion 80 outside the rectangle is not to be printed.

Referring back to FIG. 2, the user then stores S8 the points 50 as coordinates in a Cartesian coordinate system with the image. Any suitable reference point may be used for indicating the origin from which the two perpendicular lines originate, as those skilled in the art will readily recognize. The coordinates are concatenated with the particular image file for integrally attaching it therewith. As previously stated, the images sequentially displayed S10; thus, the user then directs the computer to display the next image for repeating the above-described process.

After all the images have been displayed, the software generates and automatically stores S12 an identification number to the beginning of the first file for permitting the image files to be tracked. The identification (ID) number is displayed on the screen for informing the user of the ID number for later use by the user in the tracking process. The software also automatically stores S14 the type of device which input the digital image, for example scanner or memory disk. This information is also concatenated to the first file for later use by the photofinisher.

The user then exits S16 the software. The user then initiates any well known program suitable for transmitting images over the network 30. Referring back to FIG. 2, the images are sent to the fulfillment site 20b for printing by the photofinisher. However, before sending the images, the user inputs a return address to which the prints are to be returned. The photofinisher downloads the incoming data files, and converts them into hardcopy prints as is well known in the art. The photofinisher uses the coordinates for cropping any image having cropping data attached thereto. The photofinisher may also use the information identifying the input device and identification number in the developing process for further enhancing the quality of the prints. Finally, the prints are sent via postal service mail or any similar service back to the user at the designated address.

The invention has been described with reference to a preferred embodiment. However, it will be appreciated that variations and modifications can be effected by a person of ordinary skill in the art without departing from the scope of the invention.

| Parts List |
|---|
| 10 fulfillment system |
| 20 sites |
| 30 network |
| 40 computer |
| 50 coordinates |
| 60 monitor |
| 70 printed portion |
| 80 non-printed portion |

What is claimed is:

1. A computer program product for processing digital images for eventual transmission to a remote photofinisher, the computer program product comprising a computer readable storage medium having a program stored thereon for performing the steps of:

(a) receiving a computer-readable data file having a digital representation of an image;

(b) receiving user-specified, image enhancement data input by a user, which zoom and crop data is to be used when a hardcopy is printed by the photofinisher so that the user previews the image in the selected format before printing a hardcopy;

(c) concatenating both the enhancement data that is in digital form onto the digital image data file both in independent form for integrally attaching the data thereto for forming a revised, computer-readable data file; and (d) storing the revised data file.

2. The computer program product as in claim 1, wherein step (b) includes receiving at least two coordinates that define a portion of the image which is to be included when a hardcopy is printed by the photofinisher as the image enhancement data.

3. The computer program product as in claim 2 further comprising the step of transmitting the revised data file to a remotely located photofinisher.

4. The computer program product as in claim 2 further comprising concatenating a digital code onto the data file which code identifies a device that captured the digital representation of the image.

5. The computer program product as in claim 4 further comprising concatenating a digital code onto the data file that identifies an identification for identifying the location from which the revised data is transmitted.

* * * * *